United States Patent [19]
Witzig et al.

[11] 3,771,896
[45] Nov. 13, 1973

[54] RADIAL BORING MACHINE WITH EXTENDING, ADJUSTABLE BORING HEAD

[75] Inventors: Emil Karl Witzig, Leonberg; Rudolf Frank, Ludwigsburg; Willi Klein, Denkendorf, all of Germany

[73] Assignees: Emil Karl Witzig, Leonberg; Rudolf Frank, Ludwigsburg, Germany; by said Willi Klein

[22] Filed: Sept. 2, 1971

[21] Appl. No.: 177,381

[30] Foreign Application Priority Data
Sept. 5, 1970 Germany.............. P 20 44 099.7

[52] U.S. Cl. .............................................. 408/237
[51] Int. Cl. ........................................... B23b 39/12
[58] Field of Search.................. 408/237, 236, 234; 90/16; 143/6 A, 6 C, 47 D

[56] References Cited
UNITED STATES PATENTS
2,242,293  5/1941  Eden et al...................... 408/237 X
2,525,712  10/1950  Neighbour...................... 143/47 D FOREIGN PATENTS OR APPLICATIONS
983,223  1951  France.............................. 408/237
616,799  1949  Great Britain...................... 408/236
M6933  1956  Germany............................ 408/237

Primary Examiner—Andrew R. Juhasz
Assistant Examiner—Z. R. Bilinsky
Attorney—Flynn & Frishauf

[57] ABSTRACT

The vertical support for the extension arm carrying the boring head of the boring machine includes a hollow support column, the bearings for the extending arm being located within the hollow of the support column and interconnecting a bearing pin secured to the extension arm; to secure the extension arm in a radially locked position, it is preferably formed with a conical surface which matches a conical surface within the hollow of the support column, the matching conical surfaces being capable of being pressed together, for example by hydraulic pressure. The conical surfaces are so located and arranged that when the extension arm is locked in position, by pressure of the surfaces against each other, loading on the bearings is reduced and, additionally, the reaction force due to operation of a boring tool from the boring head tends to press the conical surfaces together.

11 Claims, 4 Drawing Figures

RADIAL BORING MACHINE WITH EXTENDING, ADJUSTABLE BORING HEAD

Cross reference to related application: "RADIAL ARM BORING MACHINE," U.S. Ser. No. 177,310, filed Sept. 2, 1971.

The present invention relates to radial boring machines having a radially extending arm which carries the actual boring head, and more particularly to the support and interconnection arrangement interconnecting the extension arm of the radial boring machine with the support column thereof.

Radial boring machines usually have a machine support from which a column extends, the column being vertically adjustable. The vertical adjustment of the column is obtained by a lifting mechanism which lifts the radial extension arm, to which the boring head, including the boring spindle is located, more or less, as desired. The radial extension arm is secured to the column by means of a bearing which permits radial swinging movement thereof to enable placing the boring spindle at any desired point of the machine support, or the machine table. To adjust the machine, the column is raised, the extension arm swung to its desired radial position and the boring spindle located; just prior to initiating the boring operation, the interconnection between the extension arm and the column is locked in position, so that the boring spindle is accurately and securely guided. A locking arrangement is provided which interconnects the column with the bearing arrangement of the extension arm; this lock may be operated hydraulically.

The bearing interconnection between the extension arm and the support column is highly loaded and subject to severe operating requirements. On the one hand, the bearing must carry the substantial weight of the extension arm, as well as of the boring head and is subject to substantial force moments, particularly when the boring head is at the far end of the extension arm. Leverage, in this position, is high. When the extension arm is locked in position, the interconnection must be absolutely rigid and maintain the angular position without shifting, even under the reaction forces of operation of the machine; otherwise, the extension arm could deflect upwardly, or sideways due to the substantial leverage applied to the bearing point upon operation of the machine; the forces of the counter-pressure due to machine operation become concentrated just at the bearing. Deflection of the extension arm, and with it of the boring spindle causes inaccuracies in boring, damage to the drill, or damage to the work piece.

Known radial bore machines usually provide for movable interconnection of the column and the extension arm by bearings which are, for example, formed as roller bearings surrounding the support column. The bearings are then usually substantially overdimensioned since the support column itself cannot be reduced below a certain minimum diameter. Design requirements set practical limits to the diameter of the support column, which has the disadvantage that the support column itself cannot be made as large as desired, particularly when the reaction force from the work pieces is considered. Thus, a compromise must be made in design — on the one hand stability requires a high diameter of the support column and on the other hand, the bearing itself must have a reasonable size so that it can be fitted on the support column and in turn not take up too much useful free working space.

It is an object of the present invention to provide a radial boring machine of which the extension arm is interconnected with the support column therefor in such a manner that the dimensions of the support column can be designed with its strength requirements, without limits set thereto by the bearing construction, which is easy to assemble and disassemble, has long life and is reliable in operation and which permits an interconnection of the column and the extension arm without play when column and arm are locked together.

SUBJECT MATTER OF THE PRESENT INVENTION

Briefly, the radial boring machine has a support column which is hollow; a bearing pin extends within the hollow of the support column and the bearings are located within the hollow of the support column, so that the pin is journalled within the support column itself.

Locating the bearing inwardly of the hollow of the hollow column permits use of a column which has the dimensions required by the stability of the entire machine, independently of considerations of design of the bearing. A closed construction is possible in which the dimensions of the various elements can readily be reconciled with the actual operating requirements placed on the various elements.

In accordance with a feature of the present invention, the bearing pin and column are formed with matching conical surfaces which can be locked against each other by means of a locking arrangement. Locking of the extension arm against the column is so done that it is in the same direction as the reaction force due to boring operation. When the conical surfaces are locked together, stress on the bearings themselves is decreased so that remaining deformations at contact points of the rolling surfaces of the bearings is avoided, thus providing for long life of the bearing support. The conical surfaces, being pressed together, readily permit locating the extension arm in a fixed position, for example centering the extension arm with respect to the column, relieving the bearings from stress at the same time while providing for reliable interconnection between extension arm and column which avoids play or shift during operation of the boring machine.

The invention will be described by way of example with reference to the accompanying drawings, wherein.

Figure 1:
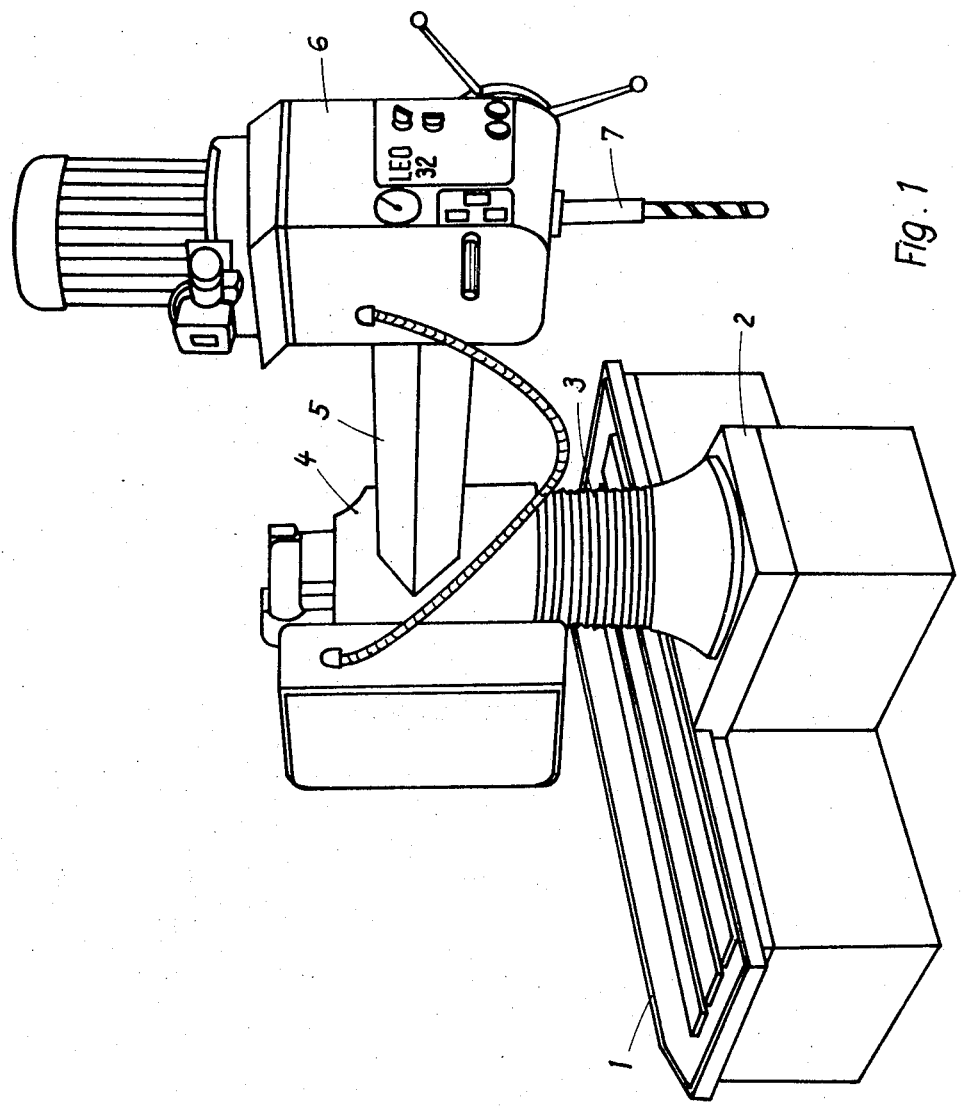
FIG. 1 is a perspective schematic view of the boring machine illustrating the major portions thereof, the boring head being shifted approximately 180° from its normal operating position to facilitate illustration.

The radial bore machine has a machine table 1 connected to a support base 2. A vertical column is longitudinally movable and located within a protective bellows 3. An interconnection assembly 4 interconnects the extension arm 5 with the support column 8 (FIGS. 2, 3, 4), the extension arm 5 carrying a boring head 6 at the end thereof to which a spindle 7 is connected carrying, for example, a drill bit. The various feed arrangements for the drill bit, and the like are included in the boring head 6 and are not further illustrated since they may have any form well known in the art.

The arm 5 is extendable by rolling on rollers 130; it is locked in position by a locking wedge generally shown at 240. The suspension for the arm 5 and the locking thereof is described in detail in copending application Ser. No. 177,310, filed Sept 2, 1971, by the inventors hereof.

Figure 2:
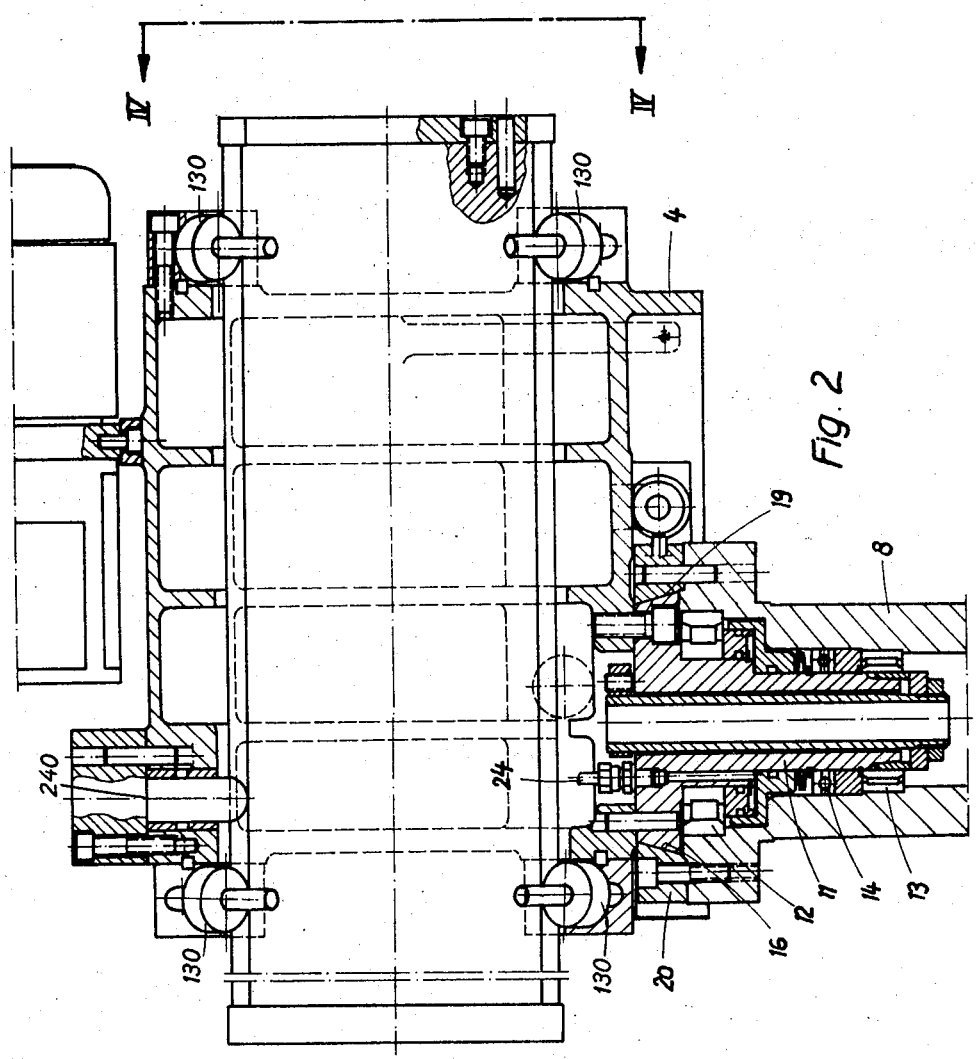
FIG. 2 is an axial sectional side view of the machine of FIG. 1 to a different scale.
Figure 3:
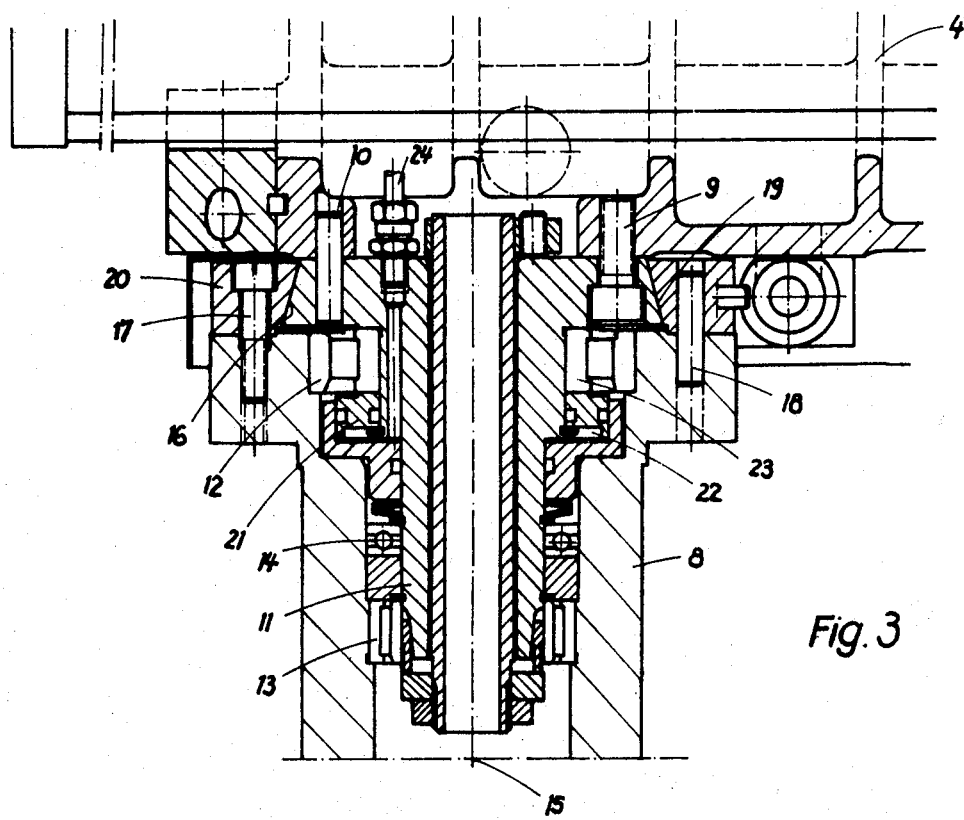
FIG. 3 illustrates, in longitudinal section, the bearing interconnection between the support and the column, to an enlarged scale.
Figure 4:
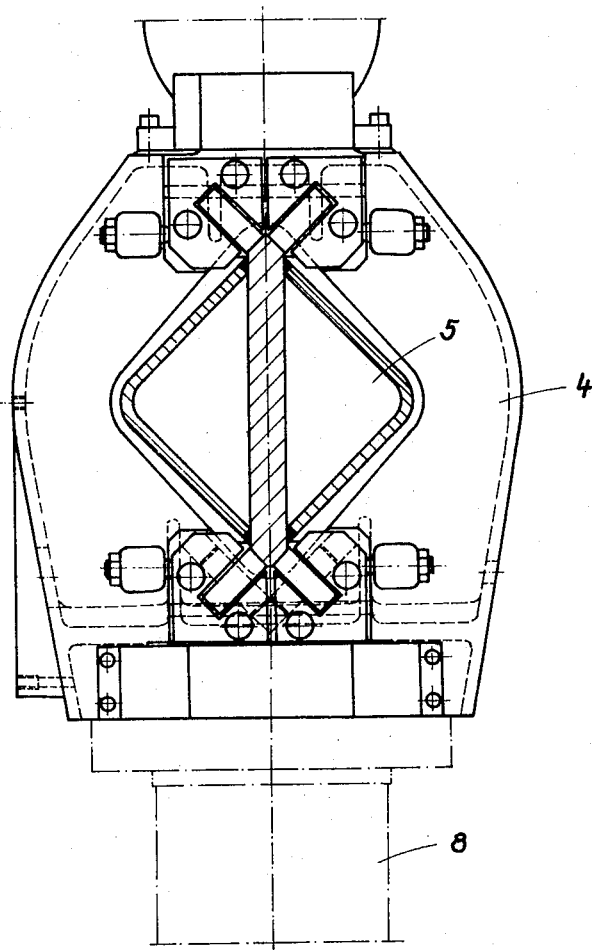
FIG. 4 is a sectional view of the support arm along section line IV—IV of FIG. 2, and further illustrating the extension arm in cross-section.

The vertical support column, covered by bellows 3, is shown in detail in FIGS. 2–4. Column 8 is cylindrical and hollow. The interconnection assembly 4 includes a bearing pin 11 secured thereto by means of screws 9 and locating pins 10, the pin 11 extending within column 8, as seen clearly in FIGS. 2 and 3. Pin 11 is connected with column 8 by means of bearings located within the column 8; these bearings include an upper roller bearing 12, a lower roller bearing 13, together effecting radial guidance of the bearing pin; and a thrust bearing 14, to accept axial forces. Bearing pin 8 has a conical surface 16 secured thereto, coaxial with the longitudinal axis 15 (FIG. 3) of column 8. The conical surface 16 matches a conical surface 19 formed on a conical ring 20 and secured to the column 8 by means of screws 17 and pins 18.

A piston 21 is slidable within a hydraulic cylinder 22 formed within column 8, the piston-cylinder arrangement being located below the upper roller bearing 12. The cylinder 22 bears against inner ring 23 of the bearing 12. Piston 21 and hydraulic cylinder 22 together form, with the conical surfaces, a locking arrangement which, as seen, is located within column 8. Pressure medium can be applied to the cylinder-piston assembly over a pressure line 24.

Applying hydraulic pressure over line 24 to cylinder 22 causes piston 21 to move upwardly and thus provide upward pressure against bearing pin 11 tending to lift the entire assembly 4, together with extension arm 5. The actual distance of movement is minimal; conical surface 16 will engage the counter conical surface 19 to provide a rigid connection, restrained against movement while, simultaneously, providing for centering of the assembly 4 with respect to axis 15 of column 8. The upward pressure additionally relieves thrust on thrust bearing 14 and the engagement of the conical surfaces relieves side forces on radial bearing 12. The interconnection, by frictional engagement, of the assembly 4, that is, of arm 5 with column 8 thus is caused by forces acting in a direction parallel to that of the spindle of the boring machine (FIG. 1) and thus parallel to the reaction force on the boring spindle. If the arm 5 is to be shifted radially, for example after termination of a specific boring operation, then it is only necessary to relieve the hydraulic pressure in cylinder 22, permitting the conical surface 16 to drop due to the weight of the assembly 4, the extension arm 5 and boring head 6, ensuring reliable separation from the counter-conical surface 19.

The interconnection of the radial arm has been described particularly in connection with a boring machine; various changes and modifications may be made to adapt the inventive concept to other machines and machine tools.

We claim:

1. Radially extending machine tool, particularly boring machine, having an adjustable machining head comprising a vertical support including a hollow support column (8);

an extension arm (5) adapted to carry a machine tool head (6);

a connection assembly (4) interconnecting the extension arm to the hollow support column, said connection assembly comprising a bearing pin (11) extending inwardly of the column (8), and bearing means (12, 13, 14) located inside the hollow of the support column and movably journalling the bearing pin (11) within the column;

means forming a conical surface (16) secured to the bearing pin;

means forming a matching, counter-conical surface (19) secured to the support column (8); and locking means (21, 22) located inside the hollow of the column (8) including means engaging said conical surfaces together to lock the connection assembly in position.

2. Machine according to claim 1, wherein the conical surfaces are co-axial with respect to the column (8).

3. Radially extending machine tool, particularly boring machine, having an adjustable machining head comprising a vertical support including a hollow support column (8);

an extension arm (5) adapted to carry a machine tool head (6);

a connection assembly (4) interconnecting the extension arm to the hollow support column, said connection assembly comprising a bearing pin (11) extending inwardly of the column (8), and bearing means (12, 13, 14) located inside the hollow of the support column and movably journalling the bearing pin (11) within the column;

means forming a conical surface (16) secured to the bearing pin;

means forming a matching, counter-conical surface (19) secured to the suport column (8); and locking means comprising a hydraulic cylinder-piston assembly, one element of said assembly being located on the support column and the other element on the bearing pin, the locking means engaging the conical surfaces together and locking the connection assembly in position.

4. Machine according to claim 3, wherein the locking means provides for axially directed pressure to press said conical surfaces together; and wherein the bearing means are so located within the column and on the pin with respect to the axially directed pressure that presence of such pressure relieves stress on the bearings.

5. Machine according to claim 3, wherein the conical surface secured to the bearing pin is directed upwardly and the conical surface secured to the column is directed downwardly to provide for engagement pressure on said surfaces upon upward loading of the pin due to reaction force pressure being transmitted from the machine tool head to the extension arm, upon operation of the machine.

6. Machine according to claim 3, wherein the machine tool head comprises a boring head including a boring spindle.

7. Machine according to claim 3, wherein the bearing means includes a bearing (12) located above the hydraulic piston-cylinder assembly, one element of said piston-cylinder assembly abutting against said bearing, the other element of said assembly bearing against the column (8).

8. Machine according to claim 3, wherein the bearing means includes a thrust bearing (14) interconnecting the bearing pin and the column, the cylinder-piston assembly, when under hydraulic pressure, relieving thrust on the thrust bearing exerted by the pin on the column.

9. Machine according to claim 1, wherein the locking means provides for axially directed pressure to press said conical surfaces together; and wherein the bearing means are so located within the column and on the pin with respect to the axially directed pressure that presence of such pressure relieves stress on the bearings.

10. Machine according to claim 1, wherein the conical surface secured to the bearing pin is directed upwardly and the conical surface secured to the column is directed downwardly to provide for engagement pressure on said surfaces upon upward loading of the pin due to reaction force pressure being transmitted from the machine tool head to the extension arm, upon operation of the machine.

11. Machine according to claim 1, wherein the machine tool head comprises a boring head including a boring spindle.

\* \* \* \* \*